(12) United States Patent
Swart

(10) Patent No.: US 8,817,044 B2
(45) Date of Patent: Aug. 26, 2014

(54) METHOD, SYSTEM AND APPARATUS FOR BLENDING OVERLAPPING IMAGES

(75) Inventor: David Swart, Waterloo (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 207 days.

(21) Appl. No.: 13/494,134

(22) Filed: Jun. 12, 2012

(65) Prior Publication Data

US 2013/0328860 A1    Dec. 12, 2013

(51) Int. Cl.
*G09G 5/00*    (2006.01)

(52) U.S. Cl.
USPC ........... 345/629; 345/619; 345/626; 345/627; 345/628; 345/639; 345/640; 348/383; 353/30; 353/94

(58) Field of Classification Search
CPC .............. G09G 5/14; G09G 2340/10; G09G 2340/125; G06T 11/60; H04N 5/44504
USPC .......... 345/419, 626–629, 639–640; 348/383; 353/30, 94
See application file for complete search history.

(56) References Cited

U.S. PATENT DOCUMENTS

| | | | | |
|---|---|---|---|---|
| 6,009,190 A * | 12/1999 | Szeliski et al. | ................. | 382/154 |
| 6,017,123 A * | 1/2000 | Bleha et al. | ........................ | 353/30 |
| 6,496,187 B1 * | 12/2002 | Deering et al. | ................ | 345/419 |
| 6,570,623 B1 * | 5/2003 | Li et al. | ............................ | 348/383 |
| 6,771,272 B2 * | 8/2004 | Deering | .......................... | 345/581 |
| 7,280,705 B1 * | 10/2007 | Frank et al. | .................... | 382/274 |
| 2005/0083492 A1 * | 4/2005 | Taubenberger | .................. | 353/94 |
| 2007/0109314 A1 * | 5/2007 | Chiu et al. | ...................... | 345/592 |
| 2007/0286230 A1 * | 12/2007 | Basu | ............................... | 370/464 |
| 2008/0266321 A1 * | 10/2008 | Aufranc et al. | ................ | 345/626 |

OTHER PUBLICATIONS

Chris Austin et al.—Radiofrequency Coil Design and Decoupling for Magnetic Resonance Imaging Published Jul. 23, 2009 Downloaded from                 http://www.phys.cwru.edu/reu/2009/materials/ChristineAustinPoster.pdf.

* cited by examiner

*Primary Examiner* — Xiao Wu
*Assistant Examiner* — Todd Buttram
(74) *Attorney, Agent, or Firm* — Perry + Currier Inc.

(57) ABSTRACT

A method, system and apparatus for blending overlapping images are provided. Image areas mapped to a common image space that includes a blend region: fixed image values are assigned to areas outside the blend region. Pixels from the blend region are iteratively sampled in the common image space, and for each respective sampled pixel corresponding to the sampled pixel in a respective image area: a value of the respective sampled pixel is changed to an average of neighbouring pixel values in the respective image area; and, when each respective sampled pixel in each of the at least two image spaces is changed to the average of the neighbouring pixels, each averaged respective sampled pixel value is normalize to a blended value, wherein iterations are repeated until a convergence criteria is met. One or more blend masks is output, each comprising at least normalized blended pixel values in the blend region.

21 Claims, 11 Drawing Sheets

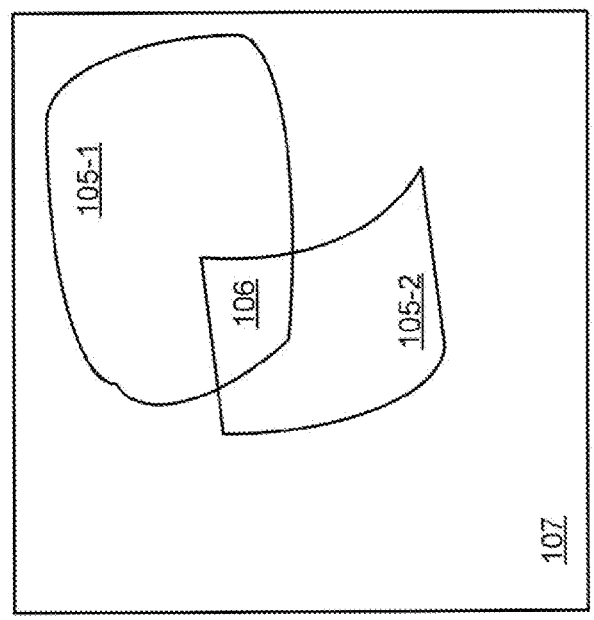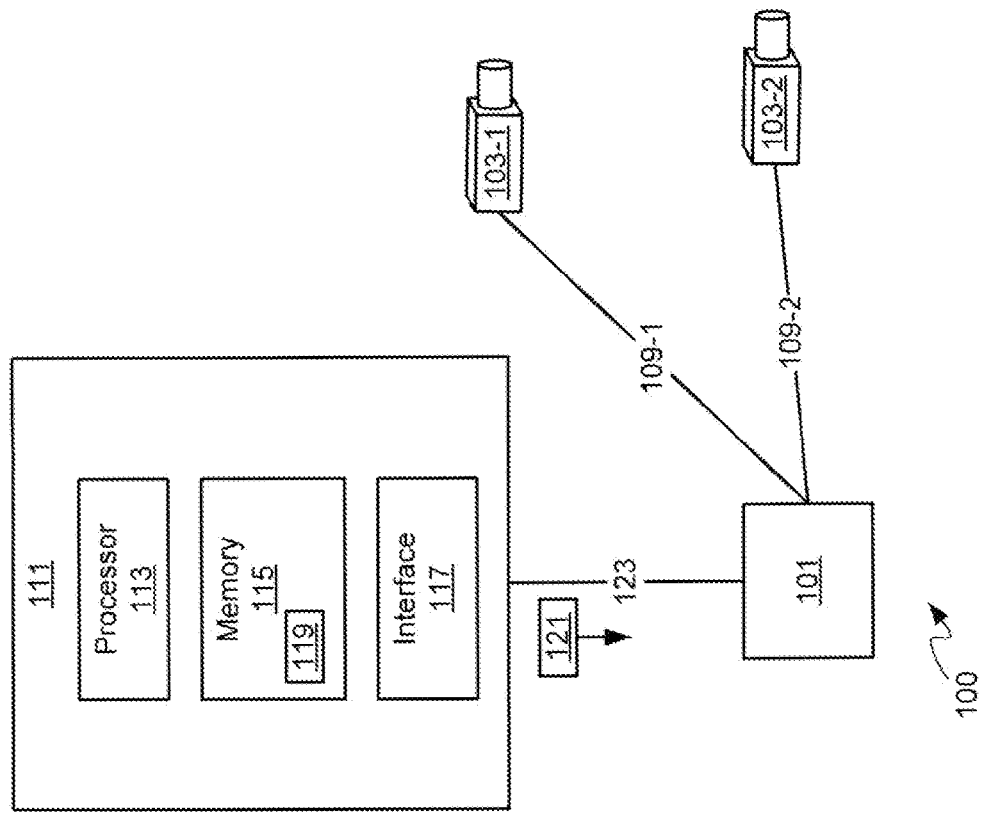
Fig. 1

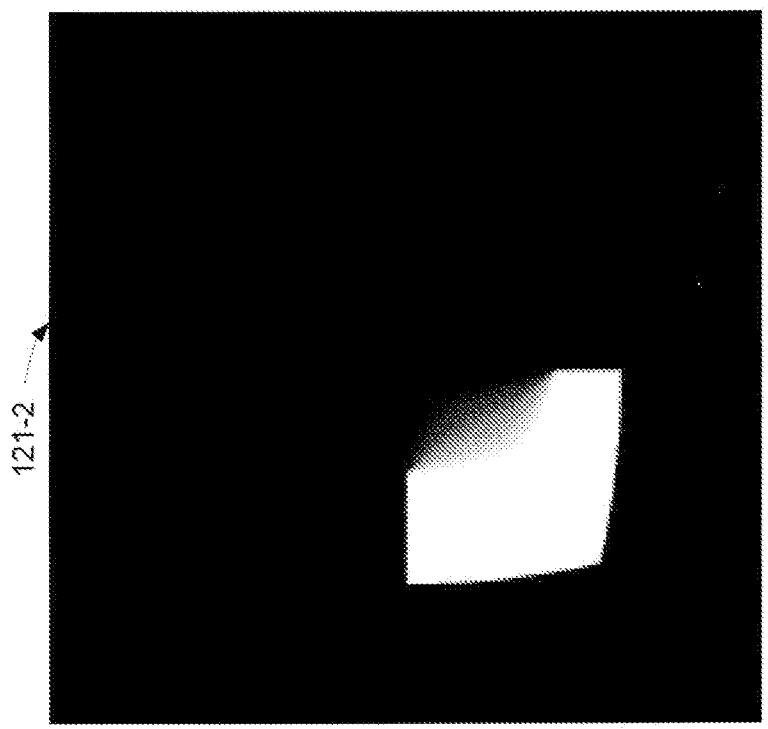
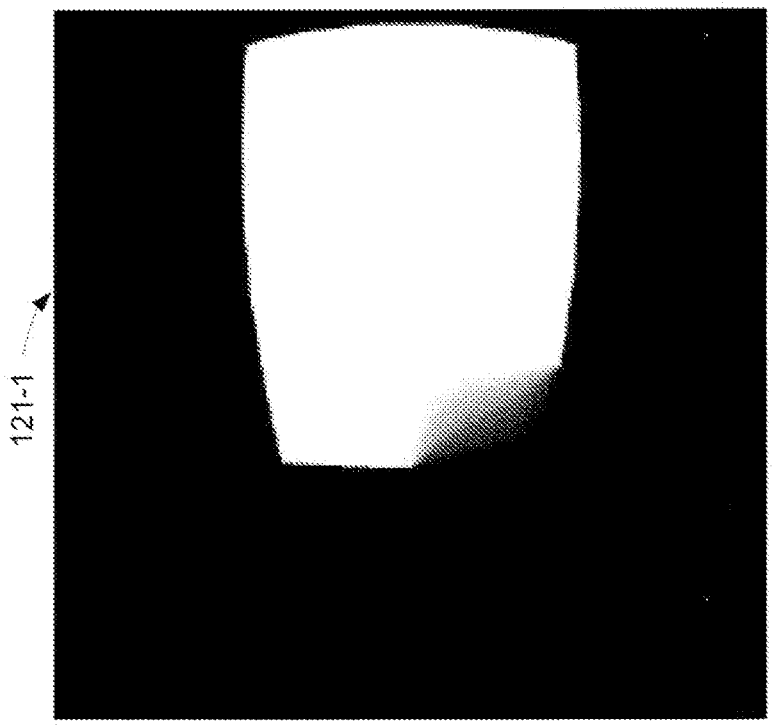
Fig. 8

US 8,817,044 B2

METHOD, SYSTEM AND APPARATUS FOR BLENDING OVERLAPPING IMAGES

FIELD

The specification relates generally to projectors, and specifically to a method, system and apparatus for blending, overlapping images.

BACKGROUND

Multiple projectors can project overlapping images onto a common screen. Generally, blending algorithms generally take as input configurations of multiple projectors, and outputs blend masks (greyscale images) for each projector. The blend mask of the region outside each projector's channel extents is set to black. For most schemes, the region within each projector's channel extents that is not covered by another projector's is set, to white. The task then is to determine a mask for the overlapping areas (the blend regions).

Existing blend algorithms take a black line, a white line (and optionally a blend direction) and calculate each edge blend between these two lines. This method is suited to projectors arranged in direct vertical and horizontal configurations.

Some methods for blending of arbitrarily defined regions calculate, the distance of a pixel to the boundary of each projector's extents. Distances are scaled so that the sum of values for each pixel equals 1.0. This defines a continuous blend region where a pixel that is close to a black edge will be darker (and closer to a white edge, lighter). Blending schemes based on this approach have: a) triangular artifacts in the region adjacent to a shared edge of different projectors; and b) first order discontinuities (where the change in the gradient's 'slope' is abrupt) at points that are equally close to two different black edges.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 1 depicts a system for blending overlapping images according to non-limiting implementations.

FIG. 8 depicts blend masks for each of the overlapping image areas of FIG. 4, according to non-limiting implementations.

DETAILED DESCRIPTION

Figure 2:
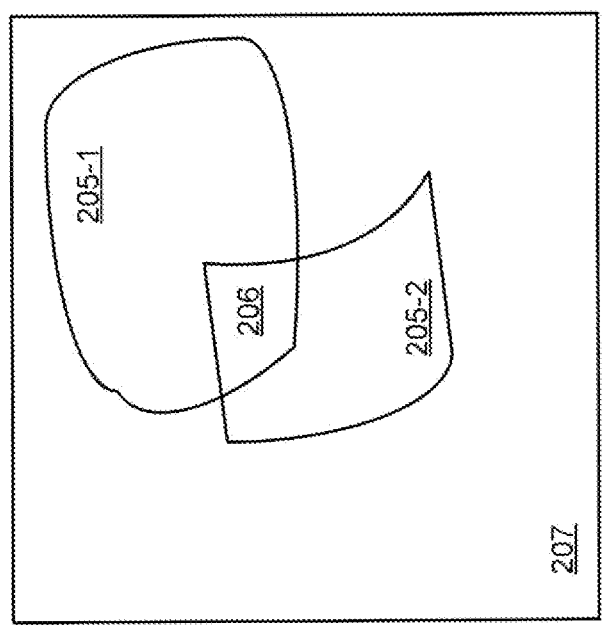
FIG. 2 depicts an image space comprising two overlapping image areas and a blend region, according to non-limiting implementations.

An aspect of the specification provides a computing device comprising: a processor enabled to: for each of at least two image areas mapped to a common image space, the common image space comprising a blend region where the at least two image areas overlap: assign a fixed image value to image pixels that are in a respective image area but outside the blend region, assign an initial value to blend pixels in the blend region, and assign a fixed non-image value to non-image pixels in the common image space but outside the respective image area; iteratively sample pixels from the blend region in the common image space, and for each respective sampled pixel corresponding to the sampled pixel in a respective image area: change a value of the respective sampled pixel to an average of neighbouring pixel values in the respective image area; and, when each respective sampled pixel in each of the at least two image spaces is changed to the average of the neighbouring pixels, normalize each averaged respective sampled pixel value to a blended value, wherein iterations are repeated until a convergence criteria is met; and output one or more blend masks, each comprising at least normalized blended pixel values in the blend region.

The processor can be further enabled to iteratively sample the pixels one or more of randomly and pseudorandomly.

The one or more blend masks can further comprise respective given image pixel values for each of the at least two image areas.

The common image space can comprise one or more of a projection mapping of projected images to the common image space, a stereographic projection and a planar projection.

The non-image pixels outside the respective image area can include pixels associated with others of the at least two image areas.

The fixed image value can be associated with white and the fixed non-image value can be associated with black.

The fixed image value can be 1 and the fixed non-image value can be 0.

The initial value of the blend pixels can be one or more of: arbitrary; associated with grey; between 0 and 1; and, 0.5.

The processor can be further enabled to normalize each averaged respective sampled pixel value to the blended value by scaling each averaged respective sampled pixel value such that the normalized values for all of the respective sampled pixels corresponding to the sampled pixel sum to 1.

The convergence criteria can comprise changes to blended values in the respective blend regions reaching a threshold value.

The convergence criteria can comprises changes to blended values in the respective blend regions reaching a threshold value of 1.

The processor can be further enabled to iteratively sample pixels using a course-to-fine multigrid process and increase pixel resolution after each previous pixel resolution has met a respective convergence criteria, until a final pixel resolution is reached and a final convergence criteria is met.

The processor can be further enabled to pass the normalized blended pixel values through a non-linear ramp function with higher order continuity prior to outputting at least one blend mask, thereby eliminating higher order discontinuities.

The processor can be further enabled to pass blended values through a non-linear ramp function prior to outputting the one or more blend masks.

The processor can be further enabled to pass blended values through a non-linear ramp function prior to outputting the one or more blend masks, the non-linear ramp function comprising $f(x)=2x2$, for values of $x \leq 0.5$ and $f(x)=1-2(1-x)2$ otherwise.

Each of the one or more blend masks can be for a given image generator providing a respective image for each of the at least two image areas.

Each of the one or more blend masks can be for a given projector generating a respective image for each of the at least two image areas.

The processor can be further enabled to map respective image generator pixels into image space pixels of the common image space.

The processor can, be further enabled to map respective image generator pixels into image space pixels using a bilinear interpolation when the respective image generator pixels do not, line up with the image space pixels.

The at least two image areas can overlap in two or more blend regions, and the processor can be further enabled to repeat the iterative sampling for each of the blend regions.

The one or more blend masks can comprise at least one of optical blend masks and physical blend masks.

Another aspect of the specification provides a method comprising, for each of at least two image areas mapped to a common image space, the common image space comprising a blend region where the at least two image areas overlap: assigning a fixed image value to image pixels that are in a respective image area but outside the blend region, assigning an initial value to blend pixels in the blend region, and assigning a fixed non-image value to non-image pixels in the common image space but outside the respective image region; iteratively sampling pixels from the blend region in the common image space, and for each respective sampled pixel corresponding to the sampled pixel in a respective image area: changing a value of the respective sampled pixel to an average of neighbouring pixel values in the respective image area; and, when each respective sampled pixel in each of the at least two image spaces is changed to the average of the neighbouring pixels, normalizing each averaged respective sampled pixel value to a blended value, wherein iterations are repeated until a convergence criteria is met; and outputting one or more blend masks, each comprising at least normalized blended pixel values in the blend region.

FIG. 1 depicts a system 100 for blending overlapping images, according to non-limiting implementations. System 100 generally comprises an image generator 101 in communication with at least two projectors 103-1, 103-2. Projector 103-1, 103-2 will also be referred to hereafter collectively as projectors 103, and generically as a projector 103. Each projector 103 is enabled to project a respective image 105-1, 105-2 onto a screen 107, images 105-1, 105-2 collectively referred to hereafter as images 105 and generically as an image 105. It is further appreciated that images 105 generally overlap in at least one area 106, and that images 105 are to be blended in area 106, such that images 105 appear to form one large image.

Images 105 can be provided to projectors 103 from image generator 101, in communication with projectors 103 via respective links 109-1, 109-2, collectively referred to as links 109 and generically as a link 109. Links 109 can include, but are not limited to wireless and wired links and are generally appreciated be non-limiting.

System 100 further comprises a computing device 111 comprising a processor 113, a memory 115, and a communication interface 117. In general, processor 113 is enabled to receive as input a configuration 119 of projectors 103 and screen 107, and output one or more blend masks 121 to one or more of image generator 101 and/or projectors 103. The one or more blend masks 121 are used by image generator 101 and/or projectors 103 to blend images 105 together in area 106 as will presently be explained. Further, while one or more blend masks 121 are depicted as being output to image generator 101 via a link 123 (wired and/or wireless as desired), in other implementations blend masks 121 are output to projectors 103.

In any event, as will presently be described, processor 113 is generally enabled to: for each of at least two image areas mapped to a common image space, the common image space comprising a blend region where the at least two image areas overlap: assign a fixed image value to image pixels that are in a respective image area but outside the blend region, assign an initial value to blend pixels in the blend region, and assign a fixed non-image value to non-image pixels in the common image space but outside the respective image region; iteratively sample pixels front the blend region in the common image space, and for each respective sampled pixel corresponding to the sampled pixel in a respective image area: change a value of the respective sampled pixel to an average of neighbouring pixel values in the respective image area; and, when each respective sampled pixel in each of the at least two image spaces is changed to the average of the neighbouring pixels, normalize each, averaged respective sampled pixel value to a blended value, wherein iterations are repeated until a convergence criteria is met; and output one or more blend masks 121, each comprising at least normalized blended pixel values in the blend region.

Image generator 101 can comprise any suitable image generator, including but not limited to, a storage device for storing cinema files, video files, display files, projector files, a video game system, a simulation system, a visualization system, a training system, a cinema system and the like.

Each projector 103 comprises a projector for projecting respective images 105, including but not limited to a digital projector, a cinema projector, an LCOS (Liquid Crystal on Silicon) based projector, a DMD (digital multimirror device) based projector and the like.

Computing device 111 can comprise any suitable computing device, including but not limited to a warping engine, a video processing device, a personal computer (PC), a server, and the like. In general, computing device 111 comprises processor 113, memory 115 (which can comprise volatile and non-volatile storage), communication interface 117, also referred to hereafter as interface 117, and optionally any suitable combination of input devices and display devices.

A blending algorithm implemented at processor 113 comprises a raster based algorithm, (i.e., it operates on a domain of a grid of pixels, however it does not necessarily raster through pixels row by row, or column by column; rather, sampling of pixels can occur in any suitable order, and is generally random in some implementations, as will presently be explained). However, it is appreciated that images 105 are mapped onto image areas in a common image space. It is further appreciated that the common image space is a computational image space comprising a projection mapping of projected images 105 to the common image space. It is yet further appreciated that the common image space is generally is indicative of a shape of screen 107. For example, when screen 107 is flat, an image space based on a planar projection can be used; when screen 107 is curved an image space based on a spherical projection can be used.

Presuming a spherical projection, the various channel extents for each projector 103 can be defined in angular space (including, but not limited to, a roll/pitch/yaw heading, and a field of view frustum) and can be mapped into a common raster domain. Treating the angular space as the surface of a sphere, any suitable mapping from a sphere to a plane can be used with methods described herein. For example, a stereographic projection is one non-limiting suitable function which maps a sphere to a plane by projecting from a point at the top of the sphere to a plane. This is different from rectilinear (gnomonic) projection which projects from the center of the sphere and can only map "below the horizon".

Attention is next directed to FIG. 2, which depicts two overlapping image areas 205-1, 205-2 including a blend region 206, in a common image space 207, also referred to interchangeably hereafter as image space 207. In, other words, image area 205-1 corresponds to image 105-1 and hence comprises the channel extents of projector 103-1 after, for example, a stereographic projection into image space 207. Similarly, image area 205-2 corresponds to image 105-2 and hence comprises the channel extents of projector 103-2 after, for example, a stereographic projection into image space 207. Hence, blend region 206 corresponds to area 106 after the stereographic projection. Overlapping image areas 205-1, 205-2 will be interchangeably referred to hereafter collectively as image areas 205 and generically as an image area 205.

In any event, processor 113 of computing device 111 constructs image space 207 after receiving configuration 119 as input, for example via an input device, and/or from image generator 101 and the like. In general, configuration 119 comprises data indicative of relative channel extents of projectors 103 and screen 107. It is appreciated that the relative channel extents are related to projector position, but not explicitly determined by projector position. Processor 113 then processes each image area 205 separately to produce one or more corresponding blend masks 121 as will presently be described.

Figure 3:
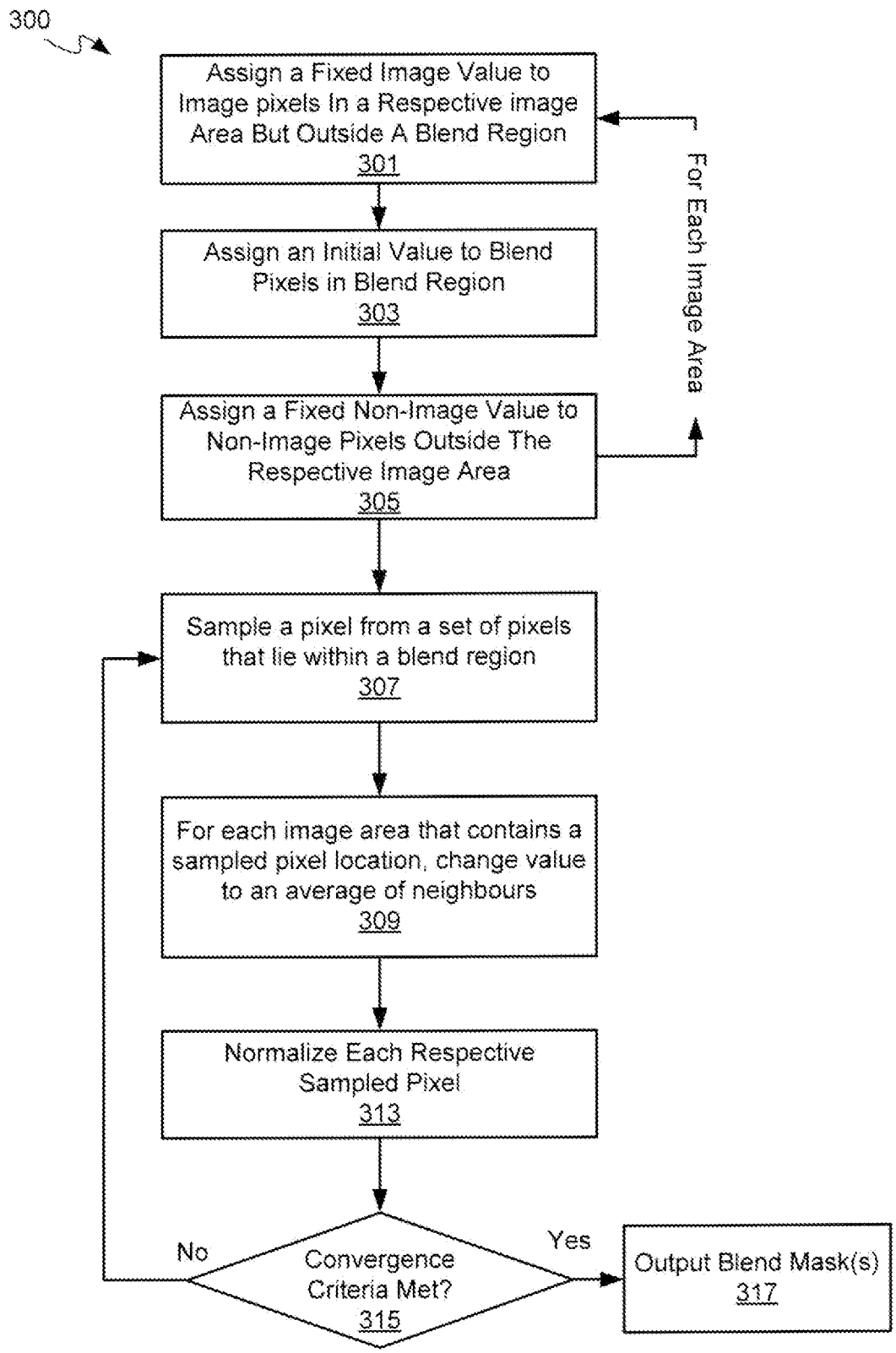
FIG. 3 depicts a flowchart of a method for blending overlapping images according to non-limiting implementations.

Attention is now directed to FIG. 3 which depicts a flowchart illustrating a method 300 for blending overlapping images, according to non-limiting implementations. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations. It is appreciated that, in some implementations, method 300 is implemented in computing device 111 by processor 113.

It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood that method 300 can be implemented on variations of system 100 as well.

In general when processor 113 is implementing method 300, for each, image area 205, processor 113 fixes the white edges of the blend, region 206 of a respective image area 205, at a fixed image value that is generally associated with white, such as "1" and fixes the black edges with a fixed non-image value that is generally associated with black, such as "0", and propagates these values into the blend region 206 for each of respective image area 205. Indeed, it is appreciated that each image area 205 comprises a respective blend region corresponding to blend region 206. Values of blend pixels in the blend region for each image area 205 are hence set to an initial value which is arbitrary, but can be one or more of associated with grey, between 0 and 1, and 0.5 In general, the initial value is non-limiting, and does not affect they final outcome of the one or more blend masks 121.

Processor 113 iteratively samples pixels from blend region 206 in image space 207, and for each respective blend region corresponding, to sampled pixels corresponding to the sampled pixel in each image area 205, propagates values at the edges of the respective blend regions into each blend region by changing the value of pixels within the blend region to the average of its neighbours. After each respective sample pixel for each image area 205 is averaged (i.e. without averaging all of the blend pixels in respective blend region, an iterative step is finished by normalizing the respective sample pixels corresponding to the sampled pixel, such that the values for each pixel sum to a fixed image value associated with white, such as "1". By iterating over this simple step many times, for example until a convergence criteria is met, and hence a suitably converged solution is detected, the white and the black bleed into blend region 206 smoothly for each image area 205. On a local level, this eliminates any sharp changes in slope, while keeping the boundaries at the white/black levels resulting in a global blend with none of edge artifacts of the prior art. The iterations stop when the observed changes to the blend values met the convergence criteria, including, but not limited to, falling below a threshold (i.e. the solution converges). In a successful prototype, iterations stopped when a cumulative change of <1.0 was achieved over 10,000 iterations.

However, any suitable convergence criteria are within the scope of present implementations. For example, the convergence criteria could be time, based (e.g. the algorithm is implemented for a given period of time). In another non-limiting example, the algorithm could be implemented for a given number of iterations based on a function based on the number of pixels in blend region 206 (i.e. the larger the number of blend pixels, the larger the number of iterations).

Method 300 is now described in more detail. However, it is appreciated that while method 300 is described with reference to two projectors 103, two images 105, two image areas 205, and one blend region 206, method 300 can also be implemented for systems that include three or more projectors, three or more images, three or more image areas and two or more blend regions. For example, when a pixel in a blend region is selected that is covered by a first projector and a second projector but not a third projector, then only the pixel values for the first projector and the second projector get averaged and normalized, as will presently be explained; however, the pixel value for the third projector remains, fixed at a non-image value for the blend region covered by the first projector and the second projector.

At blocks 301, 303, and 305, for each image area 205 mapped to image space 207: assign a fixed image value to image pixels that are in a respective image area 205 but outside a blend region (block 301), assign an initial value to blend pixels in the blend region (block 303), and assign a fixed non-image value to non-image pixels in common image space 207 but outside a respective image area 205 (block 305).

Figure 4:
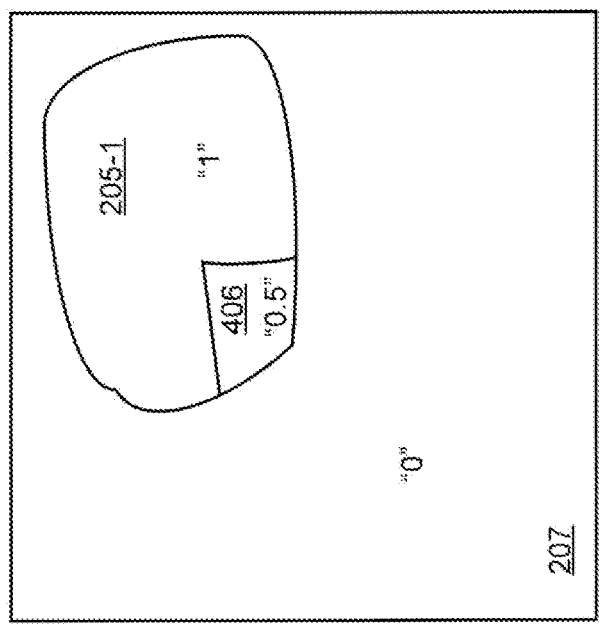
FIG. 4 depicts an image space comprising one of the overlapping image area of FIG. 2, and a respective blend region, according to non-limiting implementations.

For example, attention is directed to FIG. 4 which depicts image area 205-1 in image space 207, with a blend region 406 corresponding to blend region 206. It is appreciated that in blend region 406, images in image area 205-1 are to blend with images in a blend region of image area 205-2. It is appreciated that the part of image area 205-2 not in blend region 406 is omitted from FIG. 4 as images from corresponding projector 103-2 are not projected into this area, and hence is to be treated as a "black" region for the purposes of determining a blend mask 121 for projector 103-1.

In any event, it is further appreciated that image area 205-1, including blend region 406, is divided into pixels, for example of a similar resolution to projector 103-1, however any suitable resolution is within the scope of present implementations, and the resolution can be provided as data in configuration 119. Values for image pixels in image area 205-1, but outside blend region 406, are set to a fixed image value associated with white, such as "1", as depicted. Values for pixels outside image area 205-1 are set to a fixed value associated with black, such as "0", as depicted. Values of pixels in blend region 406 are set to an initial value, which can be arbitrary, but can generally be between 0 and 1, inclusive. In a non-limiting example, pixels in blend region 406 are set to an initial value of "0.5", as depicted.

Figure 5:
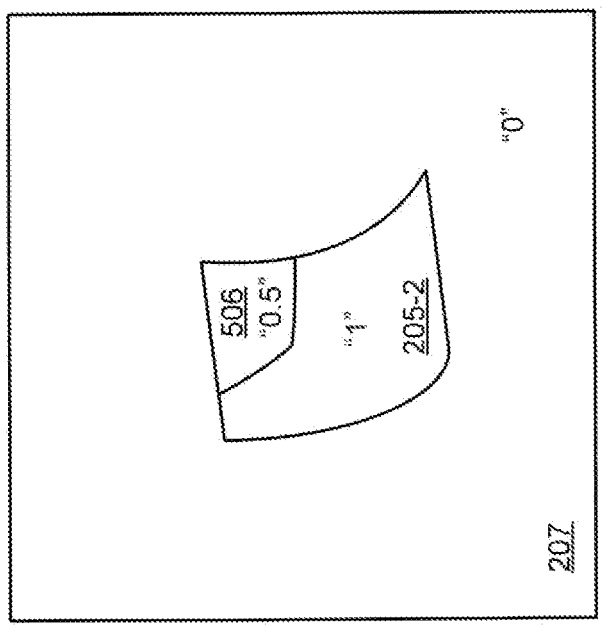
FIG. 5 depicts an image space comprising another of the overlapping image areas of FIG. 2, and a respective blend region, according to non-limiting implementations.

Similarly, attention is directed to FIG. 5 which depicts image area 205-2 in image space 207, with a blend region 506 corresponding to region 206. It is appreciated that the part of image area 205-1 not in blend region 506 is omitted from FIG. 5 as images from corresponding projector 103-1 are not projected into this area, and hence is to be treated as a "black" region for the purposes of determining a blend mask 121 for projector 103-2. In any event, it is further appreciated that image area 205-2, including blend region 506, is divided into pixels, for example of a similar resolution to projector 103-2, as described above, and indeed, the same resolution is used for both image areas 205. Values for image pixels in image area 205-2, but outside blend region 506, are set to a an image value associated with white, such as "1", as depicted. Values for pixels outside image area 205-2 are set to a non-image value associated with black, such as "0", as depicted. Values of pixels in blend region 506 are set to an initial value, which can be arbitrary, but can generally be between 0 and 1, inclusive. In a non-limiting example, pixels in blend region 506 are set to an initial value of "0.5", as depicted In general, the range of values used for image area 205-2 are the same as the range of values used for image area 205-1; for example, in each image area "0" is associated with black and "1" is associated with white. Further pixels of each blend region 406, 506 are appreciated to overlap with each other.

In other words, returning to FIG. 3, blocks 301 to 305 are repeated for each image area 205. Further, one or more of blocks 301 to 305 can occur in parallel with each other, and/or can occur in any order. Furthermore, implementing one or more of blocks 301 to 305 for each image area 205 can occur in parallel with one another, and/or can occur in any order.

In any event, once values are initially associated with pixels in image areas 205, at block 307 processor 113 begins to iteratively sample pixels from blend region 206 (and/or blend region 406 and/or blend region 506: as they each overlap, the blend region that processor 113 starts from is largely non-limiting) in common image space 207. For example, processor 113 randomly selects a pixel in blend region 406 at block 307. At block 309, for each respective sampled pixel corresponding to the sampled pixel in a respective image area, processor 113 changes a value of the respective sampled pixel to an average of neighbouring pixel values in the respective image area. This process is described in more detail below with respect to FIG. 6. At block 313, when each respective sampled pixel in each of the at least two image areas is changed to the average of the neighbouring pixels, processor 113 normalizes each averaged respective sampled pixel value to a blended value, again described below with respect to Fig, 6. At block 315, processor 113 determines whether a convergence criteria has been met, which can include but is not limited to meeting a threshold value. When the convergence criteria is not met, iterations are repeated and blocks 307 to 315 re-occur with another selected pixel (i.e. a "No" decision at block 315). When the convergence criteria is met (i.e. a "Yes" decision at block 315), at block 317 processor 113 outputs one or more blend masks 121. Block 315 is described in further detail below.

Sampling of pixels at block 307 can occur according to any suitable scheme that can include, but is not limited to, rastering through pixels row by two and/or column by column. However, such a rastering scheme can lead to artifacts in blend masks 121. To eliminate such artifacts, in some implementations, sampling of pixels at block 307 can occur one or more of randomly and/or pseudorandomly (e.g. processor 113 hence comprises and/or is in communication with, a random number generator and/or a pseudorandom number generator).

Figure 6:
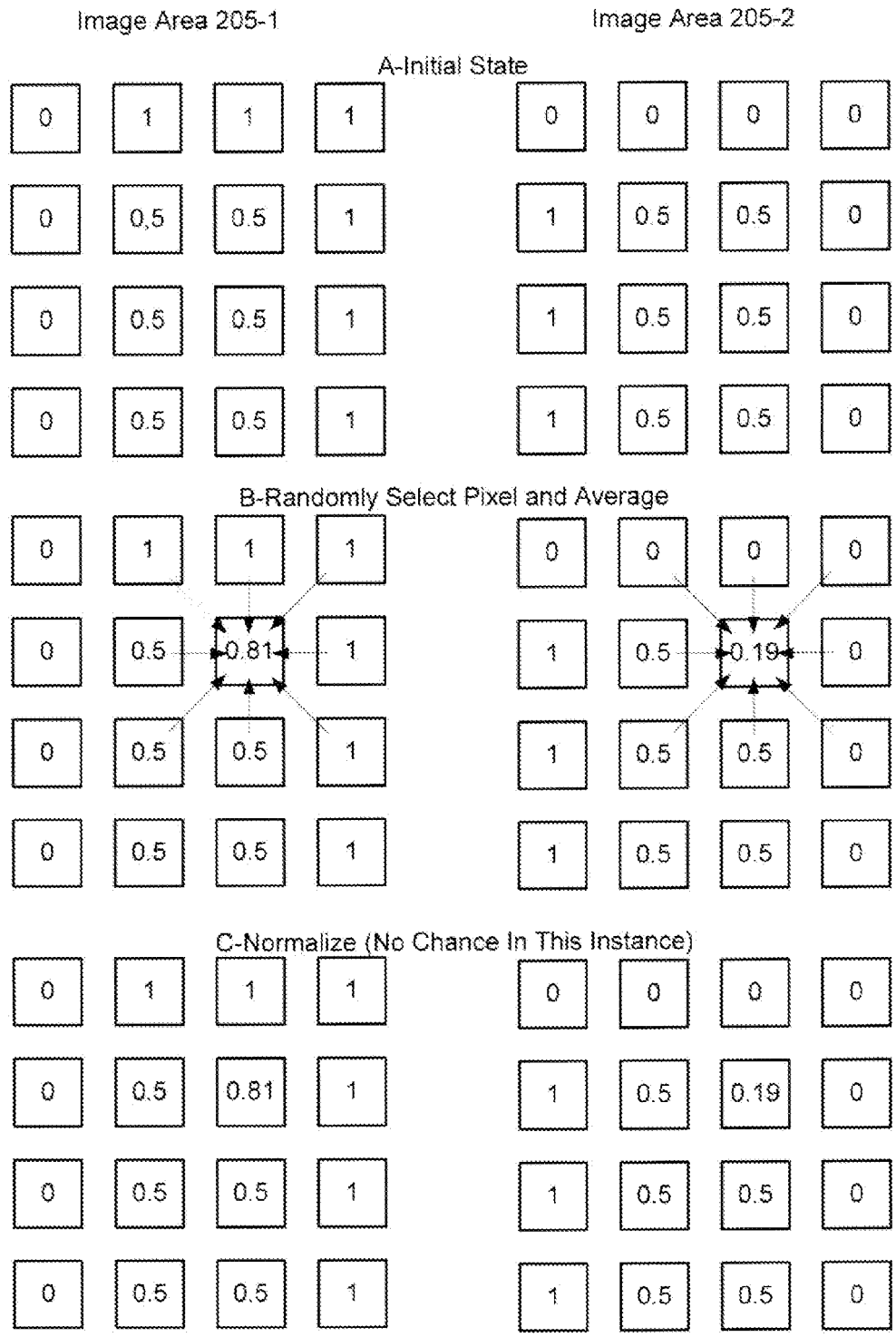
FIG. 6 depicts a values associated with pixels of the blend region of FIG. 4 being changed to averages of neighbouring pixels, and normalized when the method of FIG. 3 is applied thereto, according to non-limiting implementations.
Figure 7:
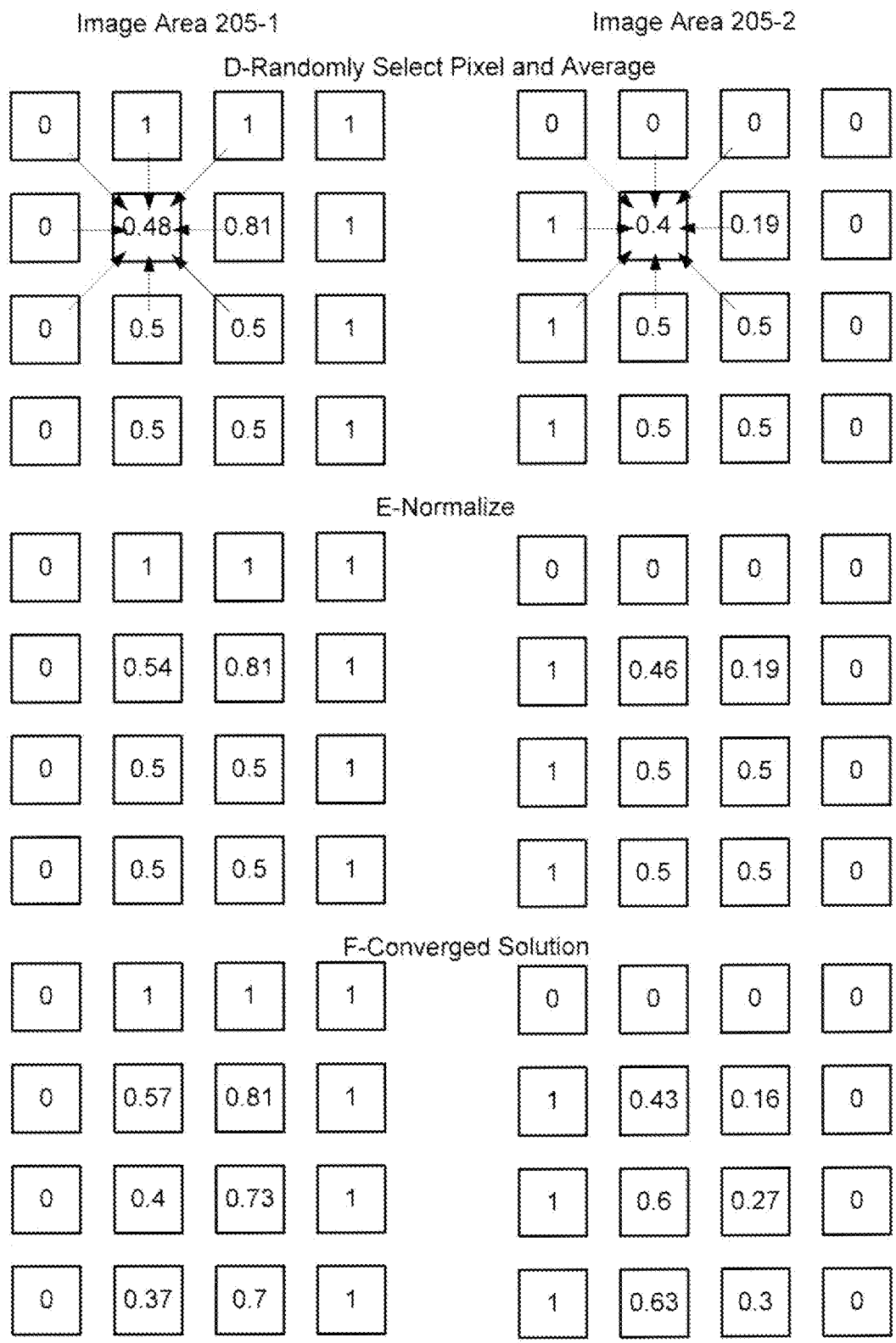
FIG. 7 depicts a values associated with pixels of the blend region of FIG. 5 being changed to averages of neighbouring pixels, and normalized when the method of FIG. 3 is applied thereto, according to non-limiting implementations.

A non-limiting example of blocks 307 to 313 are described with reference to FIGS. 6 and 7, which depict a sequence of iteratively sampling pixels in a, blend region for each of image areas 205. FIG. 6 depicts a first portion of the sequence and FIG. 7 depicts a last portion of the sequence. It is further appreciated that a left hand side of each of FIGS. 6 and 7 depict a portion of image area 205-1, while a right hand side of each of FIGS. 6 and 7 depict a portion of image area 205-2, the left hand side portion overlapping the right hand side portion. Attention is first directed to FIG. 6, which, at "A" (left hand side) depicts values of a subset pixels of blend region 406 of image area 205-1 and edge pixels associated with blend region 406 (with pixel values of "1" being white, and fixed, and pixel values of "0" being black and fixed); further at "A" (right hand side) in FIG. 6, values of a subset pixels of blend region 506 of image area 205-2 are depicted and edge pixels associated with blend region 506 (with pixel values of "1" being white, and fixed, and pixel values of "0" being black and fixed). Indeed, "A" represents the values assigned to the depicted portions of image areas 205-1, 205-2 once blocks 301-303 have been implemented.

It is appreciated that the subset of pixels depicted in FIG. 6 is merely an example and does not necessarily correspond to actual pixels of projectors 103, but are merely example pixels in image space 207. It is further assumed that each of regions 406, 506 extend below the depicted pixels with initial values of pixels in the row below the bottom depicted row being (0, 0.5, 0.5, 1) for image area 205-1 and (1, 0.5, 0.5, 0) for image area 205-2, i.e. the same as each depicted bottom row.

At "B", in FIG. 6 changes to values of a randomly selected pixel in blend regions 406, 506 are depicted. For example, processor 113 randomly samples a pixel in region 406 (block 307) that is in the $3^{rd}$ column and the $2^{nd}$ row of the depicted portion of image area 205-1, and determines an average of the neighbouring pixels (i.e. block 309): (1+1+1+1+1+0.5+0.5+0.5)/8=0.81. Hence, the value is changed from an initial value of 0.5 to 0.81 (i.e. block 309). Similarly; at "B" processor 113 changes the value of the corresponding pixel in region 506 to an average of the neighbouring pixels: (0+0+0+0+0+0.5+0.5+0.5)/8=0.19 (i.e. block 309). If there were further image areas overlapping image areas 205-1, 205-2 such that there were further blend regions overlapping regions 406, 506, processor 113 would further change the value of each respective pixel corresponding to the sampled pixel in image area 205-1 to the average of their neighbours.

At "C" of FIG. 6, processor 113 normalizes each respective sampled pixel based on the values determined at "B" (i.e. block 313). However, in this instance, as 0.81 and 0.19 already add to "1", the normalization has no effect on the pixel values.

As a convergence criteria has not yet been met at block 315, for example at least a minimum number of iterations have not occurred, and/or a total change in pixel values is above a threshold, blocks 307 to 315 repeat, at "D" of FIG. 7 processor 113 randomly samples another pixel in region 406. For example, processor 113 randomly samples a pixel in region 406 (block 307) that is in the 2nd column and the 2nd row of the depicted portion of image area 205-1, and determines an average of the neighbouring pixels (i.e. block 309): (0+0+0+1+1+0.81+0.5+0.5)/8=0.48. Hence, the value is changed from an initial value of 0.5 to 0.48 (i.e. block 309). Similarly, at "D" processor changes the value of the corresponding pixel in region 506 to an average of the neighbouring pixels: (0+0+0+1+1+0.19+0.5+0.5)/8=0.4 (i.e. block 309). If there were further image areas overlapping image areas 205-1, 205-2 such that there were further blend regions overlapping in regions 406, 506, processor 113 would further change the value of each respective pixel corresponding to the sampled pixel in image area 205-1 to the average of their neighbours.

At "E" of FIG. 6, processor 113 determines normalizes each respective sampled pixel based on the values determined at "D" (i.e. block 313). In this instance, as 0.48 and 0.4 sum to less than "1", each are normalized to sum to "1": i.e. 0.48 is changed to 0.54, and 0.4 is changed to 0.46 (with 0.54+0.46=1).

This process continues until a convergent solution is found as depicted at "F" of FIG. 7; in other words, blocks 307 to 315 are repeated until the convergent criteria is met resulting in the values depicted in "F" of FIG. 7.

It is further appreciated that while FIGS. 6 and 7 are described with reference to pixels in blend region 406 being first sampled, in other implementations, pixels in blend region 506 can be first sampled. Alternatively, processor: 113 can start from image space 207 as depicted in FIG. 2 and sample a pixel from blend region 206.

It is yet further appreciated that, while in depicted examples, there is only one blend region 206 and corresponding blend regions 406, 506 for each image region 205, in other implementations there can be more than blend region with corresponding blend regions for each image region 205. Indeed, in implementations where the at least two image areas 205 overlap in two or more areas, processor 113 is further enabled to repeat the iterative sampling for each of two or more blend regions for each image area 205, and specifically repeat blocks 307 to 315 for each blend region in each image area 205.

Returning again to FIG. 3, block 315 is described hereafter in further detail. At block 315, it is determined whether changes to blended values in the respective blend regions 406, 506 has reached a threshold, for example whether a cumulative change to the pixel values is less, than or equal to about 1. The cumulative changes can be determined by processor 113 by taking a difference, between a last previous value and a current value for each pixel and summing the differences for each pixel for each blend region 406, 506. When the threshold is not reached (e.g. a "No" decision at block 315), blocks 307 to 315 are repeated using the last determined pixel values in blend regions 406, 506. However, when the threshold is reached (i.e. a "Yes" decision at block 315), blend masks 121 are output at block 317, each blend mask 121 comprising at least normalized blended pixel values in the respective blend regions 406, 506.

Each blend mask 121 can further comprise at least respective given image pixel values for each of the at least two overlapping image areas 205, and/or pixels inside each image area 105, but outside respective blend regions 406, 506, are automatically set to 1 and/or a value associated with white, while other pixels are automatically set to 0 and/or a value associated with black.

In other words a blend mask 121 is output for each projector 103. Examples of blend masks 121 are shown in FIG. 8. Specifically, a blend mask 121-1, as depicted in FIG. 8, for projector 103-1 corresponding to a converged normalized solution similar to the left hand side of "E" of FIG. 7, and a blend mask 121-2, also depicted in FIG. 8, for projector 103-2 corresponding to a converged normalized solution similar to the right hand side of "E" of FIG. 7. It is further appreciated that each blend mask 121-1, 121-2 has been translated from numerical values as in FIG. 7 to shades of grey to better illustrate the blending that occurs in the blend regions. For example, in the blend region in the bottom left hand corner of blend mask 121-1 corresponds to the blend region in the upper right hand corner of blend mask 121-2. When blend mask 121-1 is applied to image 105-1, the bottom right hand corner of image 105-1 fades gently to black, and when blend mask 121-2 is applied to image 105-1, the upper left hand corner of image 105-2 fades gently to black.

Further, pixels in the bottom right hand corner of image 105-1 with a reduced intensity occurs due to blend mask 121-1, and there is a corresponding pixel in the upper left hand corner of image 105-2 with a complimentary reduced intensity, such that the total sum of the intensities of each pixel is the same as a single pixel projected by a single projector. In any event, the overall effect is that images 105 smoothly blend into one another. Indeed, from FIG. 8, it is apparent that the blend regions smoothly transition from white to black without the artifacts of the prior art methods.

It is appreciated that blend masks 121 can undergo further processing at block 317 before being output. For example, each blend mask 121 can be passed through a non-linear ramp function at block 317, as described below with reference to FIG. 10. In other words, the normalized blended pixel values in each blend region 406, 506 can be further processed after block 315 to produce blend masks 121-1, 121-2 at block 317.

Further, while the threshold value described herein is less than about 1, any suitable threshold is within the scope of present implementations.

In some implementations, when, an overlapping area and/or blend region is large, efficiency problems can occur in some slower computing devices (the size depending somewhat on the processing resources of computing device 111), and the black and white edges would have trouble propagating efficiently. To address this issue, processor 113 can be enabled to implement method 300 by iteratively sampling using a course-to-fine multigrid process and increase pixel resolution after each previous pixel resolution has met a respective convergence criteria, until a final pixel resolution is reached and a final convergence criteria is met at block 315.

In other words, method 300 is initially implemented using a very coarse, low resolution version grid of pixels (for example, a 50×50 grid), rather than a fine resolution as might be used by projectors 103. Method 300 is implemented until a first threshold is reached at block 315, but then the pixel resolution is increased, (for example doubled) by interpolating the values of the pixels from the coarse solution and block 307 to 315 are repeated. When higher resolution converges at block 315, the pixel resolution can again be increased and blocks 307 to 315 can again be repeated. Indeed, the pixel resolution can be increased and blocks 307 to 315 repeated until a desired pixel resolution is reached and a respective convergence criteria is met for that resolution. However, it is appreciated that the convergence criteria can be the same or different for each resolution.

In some implementations, the pixel resolution is doubled for each iteration. For example, in a successful prototype, the resolution is doubled until the number of blend pixels is >1000 for previewing purposes, and >7000 for a final solution.

In any event, implementation of a coarse-to-fine multigrid process with method 300 efficiently propagates the white and black edges into blend regions at a coarse resolution, and then refines the blend at a more local level as the resolution increases. This further speeds up the process: in the successful prototype, and using a 2.2 GHz processor, the blending takes about 1 second to generate a preview image and 10 to 30 seconds to compute the final grid to send to a projector and/or an image generator.

Figure 9:
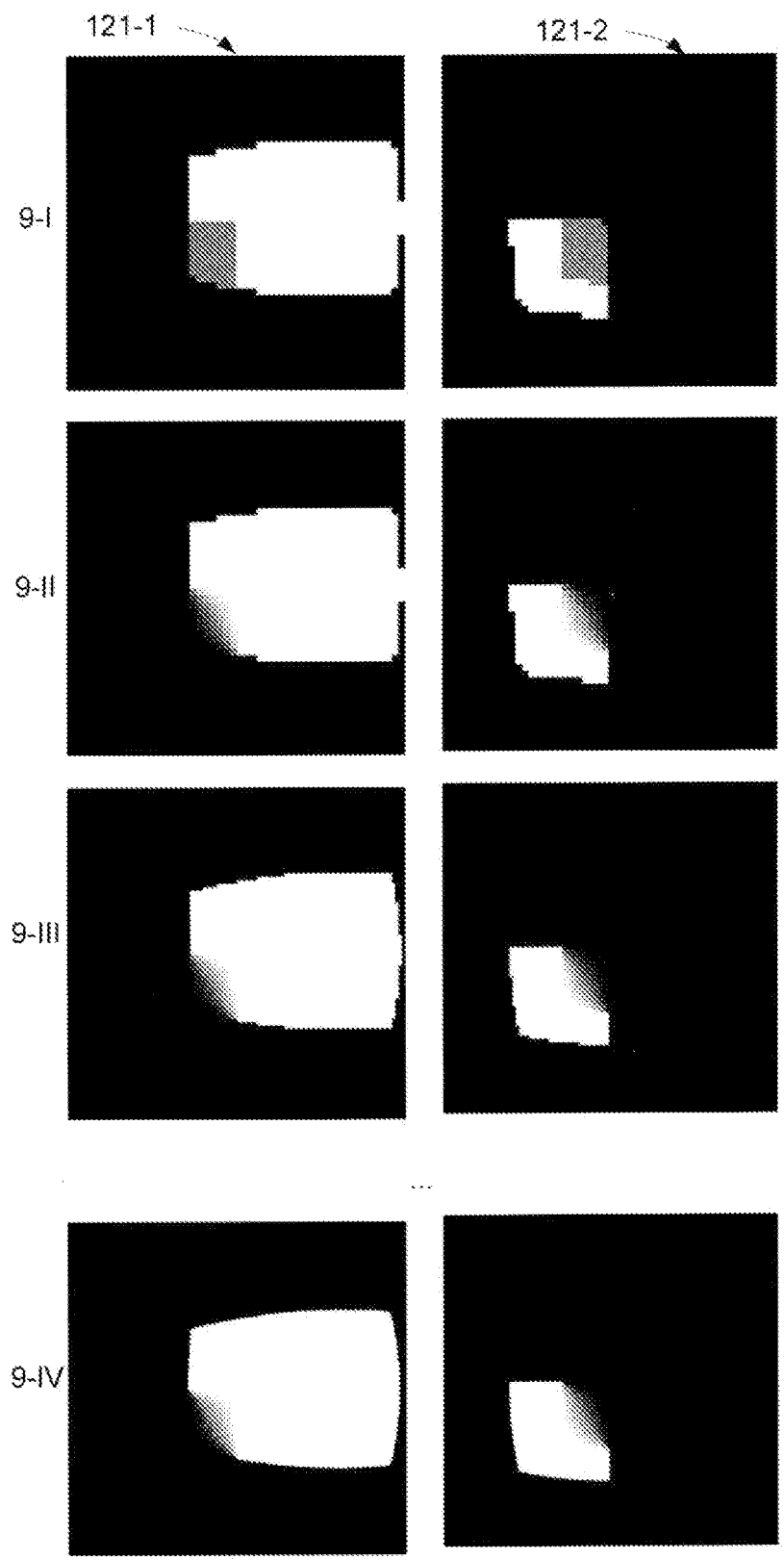
FIG. 9 depicts blend masks for each of the overlapping image areas of FIG. 4, at various resolutions when a coarse-to-fine multigrid method is applied to the method of FIG. 3, according to non-limiting implementations.

An example of implementing a coarse-to-fine multigrid process with method 300 is depicted in FIG. 9 which depicts image blend masks 121-1, 121-2 prior to implementing method 300 at "9-I", where the blend regions are depicted as being initially grey, and then after a first stage where a 50×50 grid is initially used at "9-II". The resolution is then doubled and blend masks 121-1, 121-2 are depicted after this resolution again converges. "9-III" shows blend masks 121-1, 121-2 after the resolution is yet doubled again, and "9-IV" depicts the final version of masks 121-1, 121-2 when the desired resolution is reached and the threshold is reached, similar to FIG. 8.

Figure 10:
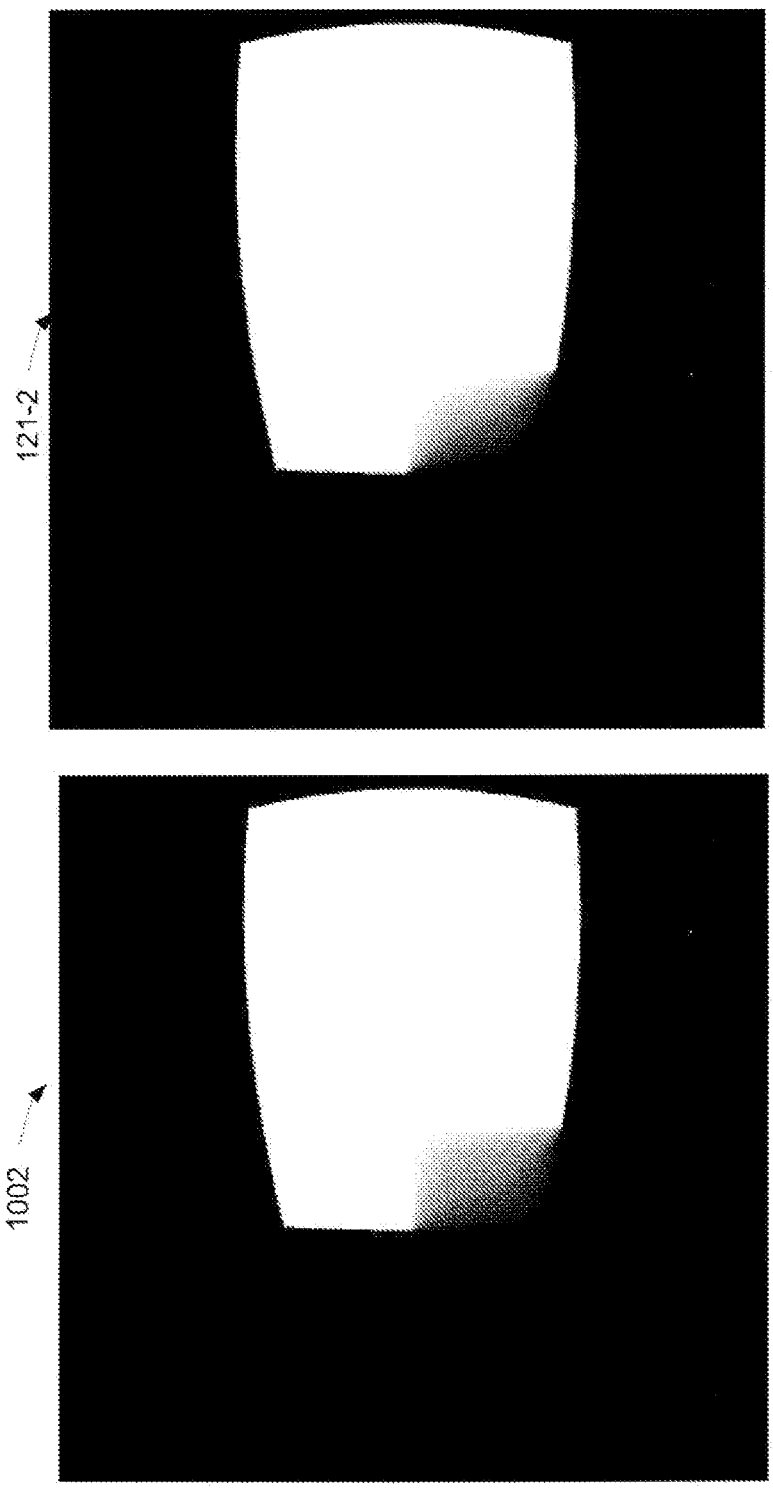
FIG. 10 depicts blend masks for one of the overlapping image areas of FIG. 4, before and after a non-linear ramp function is applied thereto, according to non-limiting implementations.

Method 300 tends to produce a linear ramp between a white edge and a black edge which can lead to a first-order discontinuity at the edges of the blend regions as depicted in blend mask 1002 of FIG. 10. To address this, normalized blended pixel values can be passed through a non-linear ramp function, to get a non-linear ramp, prior to outputting the at least one blend mask. In particular non-limiting implementations, the non-linear ramp function comprises: $f(x)=2x^2$ for values of $x \leq 0.5$; $f(x)=1-2(1-x)^2$ otherwise. However, any suitable function is within the scope of present implementations, including smooth function with higher order continuity, for example to adapt a cosine curve from 0-180 degrees. The resulting blend values for each blend region (e.g. blend regions 406, 506) are then normalized once more such that, the blend values for any pixel on a grid sum up to 1.0. For comparison, blend mask 121-2 is again depicted in FIG. 10. Indeed, it is appreciated that both blend masks 121-1, 121-2 depicted in FIG. 8 have both been passed through the non-linear ramp function, for example at block 317 of method 300.

With further reference to block 317, in order to output the blend masks 121 for each projector 103, pixels for each projector 103 are mapped into image space 207. However, more likely than not, coordinates for projector pixels will fall between pixels of image space 207. Hence, a bilinear interpolation can be used to interpolate between a point within a regular grid of pixels. In other words, processor 113 can be further enabled to map respective image generator pixels (i.e. projector pixels) into image space pixels of image space 207. Further, processor 113 can be further enabled to map respective image generator pixels into image space pixels using bilinear interpolations when the respective image generator pixels do not line up with the image space pixels.

Heretofore, only blend masks for projectors 103 have been described. Indeed, it is appreciated that each of the one or more blend masks 121 can be for a given projector 103 generating a given respective image 105 at the respective given image area 205, and specifically digital projectors. However, in other implementations, each of the one or more blend masks 121 can be for a given image generator providing a given respective image at the respective given image area, including, but not limited to analog projectors. In other words, blend masks 121 can be used for any suitable image generator other than digital projectors. Indeed, one or more blend masks 121 can comprise at least one of optical blend masks and physical blend masks, for example for blending together images projected by an analog projector, where the optical blend mask (and/or the physical blend mask) can be placed between apparatus projecting the images and a screen.

However optical filters have a limited span over which they can blend from black to white. Hence, method 300 can be adapted to include blocks for limiting a width of the blend region. For example, after blocks 301 to 315 occur, at least one additional block can occur to limit the width of respective blend regions. For example, when an optical blend is limited to a span of x degrees, then a buffer region can be limited to within x/2 degrees of this boundary. Next, the buffer region can intersect with an original blend region to create a new blend region with an x degree width.

Figure 11:
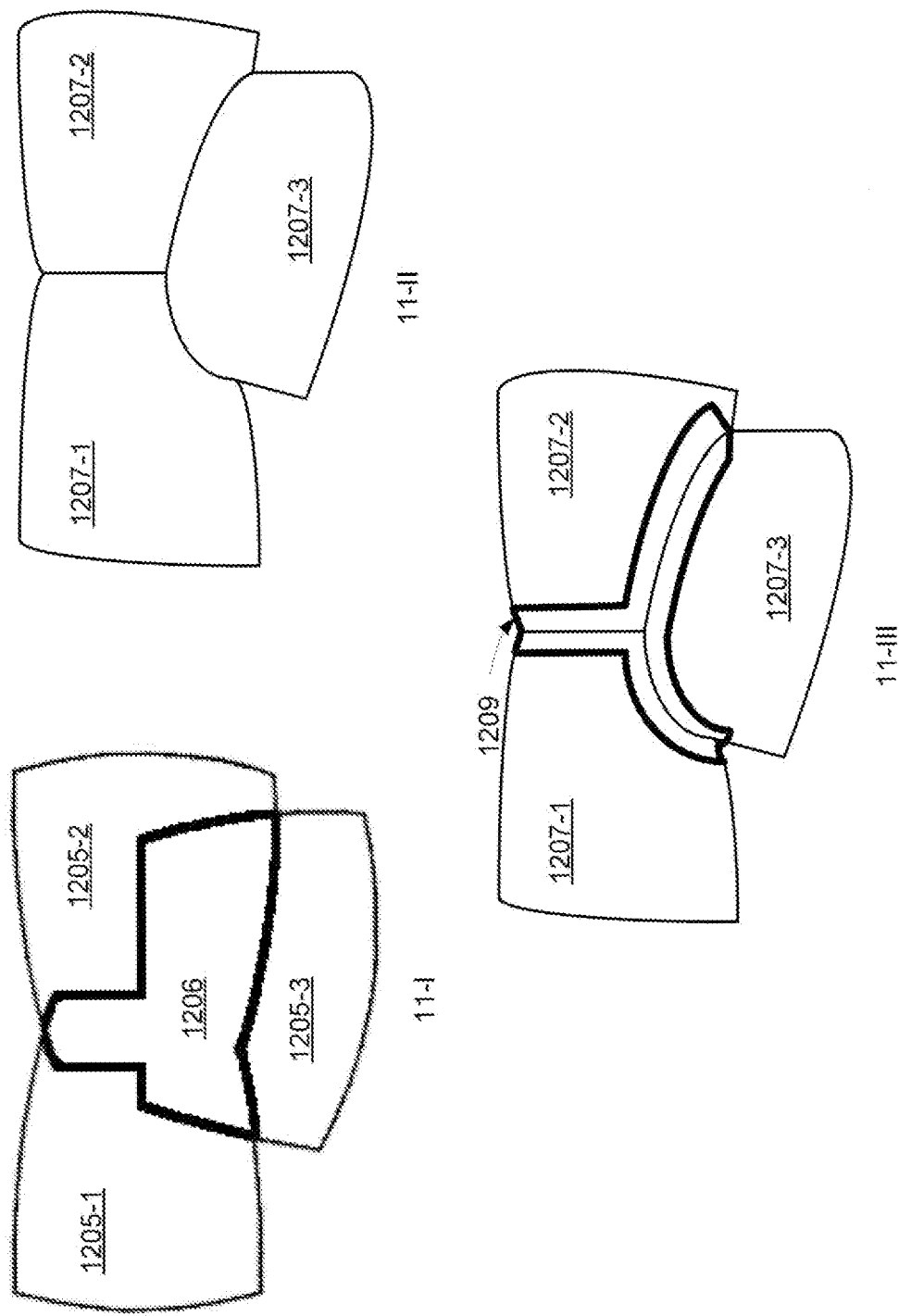
FIG. 11 depicts steps in adapting the method of FIG. 3 for producing optical blend masks, according to non-limiting implementations.

For example, attention is next directed to FIG. 11, which depicts three image areas 1205-1, 1205-2, 1205-3 at 11-I (e.g. corresponding to respective images projected from three different projectors), and a blend region 1206 (it is appreciated that blend region 1206 includes blend regions for the various combinations of image, areas 1205-1, 1205-2, 1205-3). At 11-II, Outlines of three areas 1207-1, 1207-2, 1207-3 where each projector is dominant is provided, area 1207-1 corresponding to image area 1205-1, area 1207-2 corresponding to image area 1205-2, and area 1207-3 corresponding to image area 1205-3. At 11-III a buffer 1209 is provided around boundaries between regions 1207-1, 1207-2, 1207-3 within x/2 degrees of the boundaries between regions 1207-1, 1207-2, 1207-3, presuming a limit of x degrees to an optical blend; buffer 1209 can be, intersected with the original blend region 1206 and taken as a new blend region with a limited width.

It is yet further appreciated that while stereographic projections have been described heretofore, method 300 can be applied to planar configurations, for example by omitting steps that maps to and from the sphere.

Further, when using stereographic projections, any suitable sphere-to-plane mapping is within the scope of present implementations including, but not limited to, an "octahedral quaternary triangular mesh" as described in G. Dutton. "Encoding and Handling Geospatial Data with Hierarchical Triangular Meshes." In Proceedings of the 7th Symposium on Spatial Data Handling, pp. 16-28. Delft NL, 1996.

It is yet further appreciated that computing device 111 can be combine with one or more of image generator 101 and one or more of projectors 103, such that outputting blend masks 121 at block 317 of method 300 can comprise outputting blend masks to another component of the same apparatus; hence outputting blend masks 121 does not necessarily comprise transmitting blend masks 121 to a different element of system 100 using links 109, 123.

In any event, described herein is a method, system and apparatus for blending overlapping images that eliminate the artifacts of previous methods.

Those skilled in the art will appreciate that in some implementations, the functionality of computing device 111 can be implemented using pre-programmed hardware or firmware elements (e.g., application specific integrated circuits (ASICs), electrically erasable programmable read-only memories (EEPROMs), etc.), or other related components. In other implementations, the functionality of computing device 111 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A computing device comprising:
a processor enabled to:
for each of at least two image areas mapped to a common image space, the common image space comprising a blend region where the at least two image areas overlap: assign a fixed image value to image pixels that are in a respective image area but outside the blend region, assign an initial value to blend pixels in the blend region, and assign a fixed non-image value to non-image pixels in the common image space but outside the respective image area;
iteratively sample pixels from the blend region in the common image space, and for each respective sampled pixel corresponding to the sampled pixel in a respective image area: change a value of the respective sampled pixel to an average of neighbouring pixel values in the respective image area; and, when each respective sampled pixel in each of the at least two image spaces is changed to the average of the neighbouring pixels, normalize each averaged respective sampled pixel value to a blended value, wherein iterations are repeated until a convergence criteria is met;
output one or more blend masks, each comprising at least normalized blended pixel values in the blend region; and,
pass blended values through a non-linear ramp function prior to outputting the one or more blend masks, the non-linear ramp function comprising $f(x)=2x^2$, for values of $x \leq 0.5$ and $f(x)=1-2(1-x)^2$ otherwise.

2. The computing device of claim 1, wherein the processor is further enabled to iteratively sample the pixels one or more of randomly and pseudorandomly.

3. The computing device of claim 1, wherein the one or more blend masks further comprise respective given image pixel values for each of the at least two image areas.

4. The computing device of claim 1, wherein the common image space comprises one or more of a projection mapping of projected images to the common image space, a stereographic projection and a planar projection.

5. The computing device of claim 1, wherein the non-image pixels outside the respective image area includes pixels associated with others of the at least two image areas.

6. The computing device of claim 1, wherein the fixed image value is associated with white and the fixed non-image value is associated with black.

7. The computing device of claim 1, wherein the fixed image value is 1 and the fixed non-image value is 0.

8. The computing device of claim 1, wherein the initial value of the blend pixels is one or more of: arbitrary; associated with grey; between 0 and 1; and, 0.5.

9. The computing device of claim 1, wherein the processor is further enabled to normalize each averaged respective sampled pixel value to the blended value by scaling each averaged respective sampled pixel value such that the normalized values for all of the respective sampled pixels corresponding to the sampled pixel sum to 1.

10. The computing device of claim 1, wherein the convergence criteria comprises changes to blended values in the respective blend regions reaching a threshold value.

11. The computing device of claim 1, wherein the convergence criteria comprises changes to blended values in the respective blend regions reaching a threshold value of 1.

12. The computing device of claim 1, wherein the processor is further enabled to iteratively sample pixels using a course-to-fine multigrid process and increase pixel resolution after each previous pixel resolution has met a respective convergence criteria, until a final pixel resolution is reached and a final convergence criteria is met.

13. The computing device of claim 1, wherein the processor is further enabled to pass the normalized blended pixel values through a non-linear ramp function with higher order continuity prior to outputting at least one blend mask, thereby eliminating higher order discontinuities.

14. The computing device of claim 1, wherein the processor is further enabled to pass blended values through a non-linear ramp function prior to outputting the one or more blend masks.

15. The computing device of claim 1, wherein each of the one or more blend masks is for a given image generator providing a respective image for each of the at least two image areas.

16. The computing device of claim 1, wherein each of the one or more blend masks is for a given projector generating a respective image for each of the at least two image areas.

17. The computing device of claim 1, wherein the processor is further enabled to map respective image generator pixels into image space pixels of the common image space.

18. The computing device of claim 1, wherein the processor is further enabled to map respective image generator pixels into image space pixels using a bilinear interpolation when the respective image generator pixels do not line up with the image space pixels.

19. The computing device of claim 1, wherein the at least two image areas overlap in two or more blend regions, and the processor is further enabled to repeat the iterative sampling for each of the blend regions.

20. The computing device of claim 1, wherein the one or more blend masks comprise at least one of optical blend masks and physical blend masks.

21. A method comprising,
for each of at least two image areas mapped to a common image space, the common image space comprising a blend region where the at least two image areas overlap: assigning a fixed image value to image pixels that are in a respective image area but outside the blend region, assigning an initial value to blend pixels in the blend region, and assigning a fixed non-image value to non-image pixels in the common image space but outside the respective image area;
iteratively sampling pixels, by a processor, from the blend region in the common image space, and for each respective sampled pixel corresponding to the sampled pixel in a respective image area: changing a value of the respective sampled pixel to an average of neighbouring pixel values in the respective image area; and, when each respective sampled pixel in each of the at least two image spaces is changed to the average of the neighbouring pixels, normalizing each averaged respective sampled pixel value to a blended value, wherein iterations are repeated until a convergence criteria is met; outputting one or more blend masks, each comprising at least normalized blended pixel values in the blend region; and,
passing blended values through a non-linear ramp function prior to outputting the one or more blend masks, the non-linear ramp function comprising $f(x)=2x^2$, for values of $x \leq 0.5$ and $f(x)=1-2(1-x)^2$ otherwise.

* * * * *